TRAFFIC CONTROL SYSTEM
Filed Feb. 23, 1961
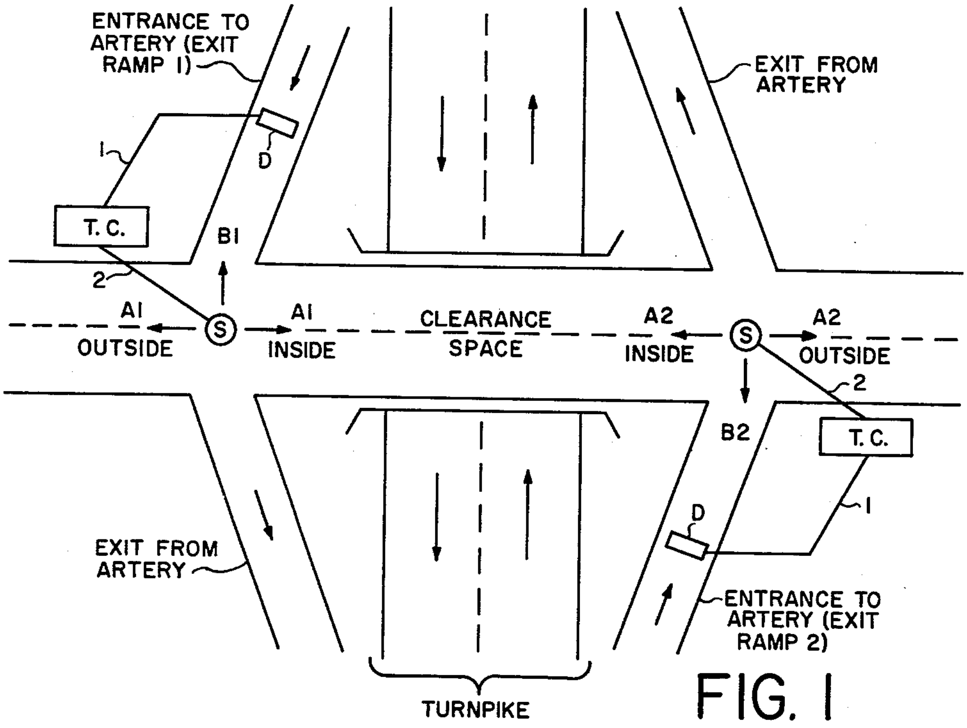
FIG. 1
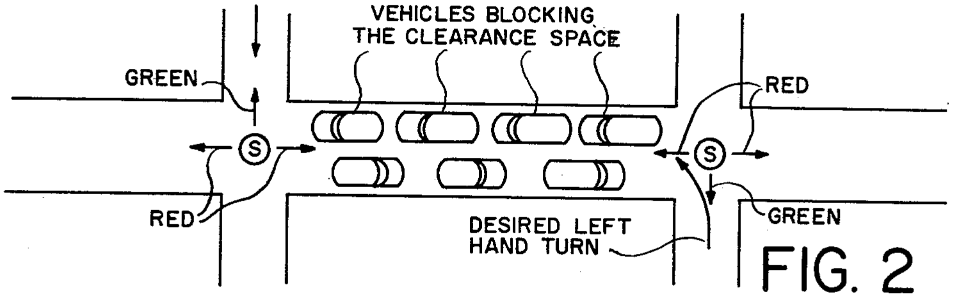
FIG. 2
(PRIOR ART)
A — B
| | REST | FIRST CLEAR. | LAG GREEN | 2ND CLEAR. | B GREEN | B CLEAR. |
|---|---|---|---|---|---|---|
| ARTERY OUTSIDE | G | Y | R | R | R | R |
| ARTERY INSIDE | G | G | G | Y | R | R |
| SIDE STREET | R | R | R | R | G | Y |
TIME →
ONE CYCLE
FIG. 3
INVENTOR.
CHARLES L. DU VIVIER
BY Harold A. Dixon
ATTORNEY INVENTOR.
CHARLES L. DU VIVIER
BY
Harold A. Dixon
ATTORNEY

*INVENTOR.*
CHARLES L. DU VIVIER
*BY* Harold A. Dixon
ATTORNEY

WITH ARTERY CLEARANCE

| POSITION | 1 | 2 | 3 | 4 | 5 | 6 | 7 | 8 | 9 | 10 | 11 |
|---|---|---|---|---|---|---|---|---|---|---|---|
| A OUT | R | G | G | G | G | G | Y | R | R | R | R→ |
| A IN | R | G | G | G | G | G | G | G | Y | R | R→ |
| SS | Y | R | R | R | R | R | R | R | G | G | G→ |
| | | | | REST | SHORT | SHORT | | | | | |

WITHOUT ARTERY CLEARANCE

| | | | | REST | SHORT | SHORT | | SHORT | SHORT | | |
|---|---|---|---|---|---|---|---|---|---|---|---|
| POSITION | 1 | 2 | 3 | 4 | 5 | 6 | 7 | 8 | 9 | 10 | 11 |
| A OUT | R | G | G | G | G | G | Y | R | R | R | R→ |
| A IN | R | G | G | G | G | G | Y | R | R | R | R→ |
| SS | Y | R | R | R | R | R | R | G | G | G | G→ |

INVENTOR.
CHARLES L. DU VIVIER
BY Harold A. Dixon
ATTORNEY

Feb. 11, 1964 C. L. DU VIVIER 3,121,213

TRAFFIC CONTROL SYSTEM

Filed Feb. 23, 1961 5 Sheets-Sheet 5

*INVENTOR.*
CHARLES L. DU VIVIER
*BY* Harold A. Dixon
ATTORNEY 3,121,213
TRAFFIC CONTROL SYSTEM
Charles L. Du Vivier, Darien, Conn., assignor, by mesne assignments, to Laboratory for Electronics, Inc., Boston, Mass., a corporation of Delaware
Filed Feb. 23, 1961, Ser. No. 91,221
9 Claims. (Cl. 340—35)

This invention relates to a traffic controller and system. More particularly the invention relates to a traffic controller which is used in conjunction with another traffic controller at two closely spaced intersections along a street such as an artery, or at opposite ends of a bridge or overpass. One particular application of the invention applies to the intersection of entrance and exit ramps from a turnpike to an artery commonly called a diamond interchange.

Where an artery has first and second cross or side streets to form closely spaced intersections the intersection contains three-faced or four-faced traffic signals (depending upon a one or two-way cross street) and the cross street or exit ramps contain a vehicle actuated detector for traffic entering the artery. A traffic controller at each intersection controls the traffic signal at that intersection in response to vehicle actuation on the cross street or exit ramp detector by traffic approaching the artery.

Each traffic signal may have one or two faces facing the cross-street or exit ramp; another face faces artery traffic approaching in one direction; a further face faces artery traffic flowing in the other direction. Thus one of the signal faces at one intersection faces a similar signal at the other intersection and each is referred to as the artery inside faces; the opposite face on the same signal is referred to as the artery outside face.

In such a system the traffic controllers normally provide a green signal to artery traffic in both arterial directions; the artery inside and outside signal faces are both green. Vehicle actuation at one or both intersection side streets results in one or both of the traffic signals changing colors to provide green signals to the side streets and red stop signals to the artery. In such a case, a left-hand turn or straight through flow from the cross street may be impeded by arterial vehicles stopped or trapped between or in the intersections by the artery red signals.

To overcome this problem it has been suggested that the controllers may be "mutually coordinated" (as in U.S. Patent 2,122,410 to E. H. Eames) to operate together. It has also been suggested that prior to the transfer of the right-of-way to the side street, the controllers may provide an "artery inside clearance period" between the two intersections. This artery clearance is provided by maintaining the artery inside faces of the two signals green for a period of time after the artery outside signals have turned from green to amber and then to red in response to vehicle actuation. Thus the red outside signals prevent artery traffic from flowing into the roadway between the two intersections while the inside green signals permit artery vehicles to clear the space between the intersections. Subsequently a cross-street vehicle desiring to make a left-hand turn onto the artery or go straight through will find the roadway and intersections clear.

However, such an extended artery green inside clearance period may be both unecessary and undesirable under certain circumstances. For example, when there is vehicle actuation on the side street at only one intersection, no separate inside green clearance period at the other intersection is necessary to aid left-hand turns from the actuated side street onto the artery because the other intersection will be in its normal non-actuated state with green on the artery. Under such conditions no inside green clearance period is required at the actuated intersection. The artery between the intersections which would be cleared by such a method will be immediately filled by other vehicles coming from the non-actuated intersection. Since a traffic controller is inherently a cyclic timing device allotting a portion of time to both intersecting streets, it is clear that any time devoted to an unnecessary function decreases the efficiency to move traffic on both streets.

Accordingly, this invention provides for an inside clearance period which extends the artery portion of the controller cycle time in response to actuations on both intersections but in which the artery portion of the cycle time of the controller is not extended in response to actuations on only one intersecting side street; thus inside clearance is omitted entirely or is provided by a switching of signals without extension of the artery portion of the cycle.

In such a system which provides an inside green clearance period in response to vehicle actuation on both side streets and no artery inside clearance in response to vehicle actuation on only one side street, it may be desirable to provide for a left-hand turn from the artery to one of the side streets in the event of transfer of right-of-way (vehicle actuation) at the other intersection. In the system stated above when there are vehicles on only one side street, any left hand turn from the artery to the other side street is hindered by artery traffic since the other (non-actuated) intersection is normally providing an artery green signal. However, if the artery outside signals of both controllers are interconnected to show similar colors at the same time, the controllers may be operated at maximum efficiency without inside clearance time in its cycle length while still providing an inside green clearance at the non-actuated intersection for a left hand turn from the artery into the side street since the artery outside signal at that intersection will be red.

Consequently, one aspect of the invention provides that in such a system of mutually coordinated local controllers that a roadway inside clearance time period is provided when vehicle actuations have been received from both intersections and that no inside clearance time period is provided if actuations are received from only one intersection thereby providing more efficient use of traffic cycle time.

Another aspect of the invention is a controller and a system which provides for a two-way inside arterial green clearance time period in response to actuations received from both side streets and which omits this time period in response to actuations of only one of the side streets.

Another aspect of the invention in such a system is the provision of a traffic controller and a system which provides a two-way inside artery green clearance time period which extends the time of a normal traffic signal cycle in response to vehicles present on both side streets but which provides a one-way clearance at the non-actuated intersection without extension of the normal cycle time of the controller in response to vehicles on only one side street.

Thus it is an object to provide an improved traffic controller for operation at one of two closely spaced intersections at which clearance is desired between the intersections.

An object is to provide an improved local traffic controller which may insert or omit a clearance time period in its cycle under external or remote control.

Another object is to provide a system of traffic control at two closely spaced intersections of side streets with a common artery, in which an artery inside clearance time period is provided only when the detectors of both side streets have been actuated.

Another object is to provide a traffic controller and control system for two closely spaced intersections in which a two-way artery clearance is provided for actuations on both side streets while only a one way artery clearance at one intersection is provided for actuations of the other intersection.

A further object is to provide a highly efficient controller or system of the type disclosed and more particularly a system which will aid left turns without decreasing the system efficiency.

A further object is in a traffic controller or control system which provides for an inside artery green clearance period, to limit or omit such clearance period when only one side street has been actuated.

A still further object is in such a controller or system which omits the inside artery clearance time period in response to vehicle actuation of only one side street detector, to provide an artery clearance period at the non-actuated intersection without any increase in the normal cycle time of the controller at such actuated intersection.

The term clearance is used in the sense that accord of right-of-way is continued for permitting vehicles to leave a space while other vehicles are prevented from entering that space. Thus an extension of the controller's time period to provide a longer green time on the inside signal lamps allows artery vehicles between the intersections to leave while the outside red signals prevent vehicles from entering the space between the intersections; thus reference is made to a clearance time period. However, if the outside signal faces are controlled by each other, the inside signal face at the non-actuated intersection may be green while the two outside signal faces are red; this also is clearance (one-way) even though the cycle time is not extended.

The scope of this invention, these and further objects will be apparent from the following description, drawing and claims.

FIG. 1 illustrates one application of the invention to the intersection of entrance and exit ramp of a turnpike with an artery.

FIG. 2 illustrates the problem which requires an artery clearance.

FIG. 3 illustrates a time sequence of green, yellow and red signals on the inside, outside and side street signals which will provide artery clearance.

Figure 4:
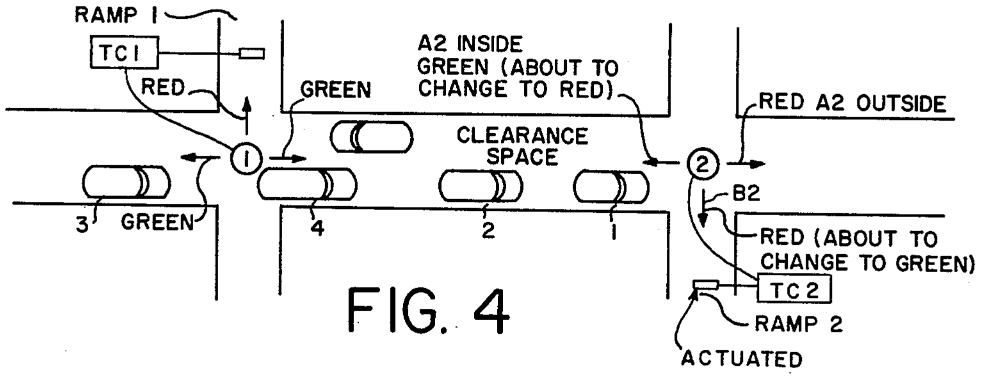
FIGS. 4 and 5 show the signal conditions at the intersections when only ramp 2 is actuated to illustrate that inside clearance time period is neither necessary nor desirable.

FIG. 1 illustrates one application of the invention at two intersections of an artery having entrance ramp and exit ramps from a turnpike. The invention has many other obvious applications; for example intersections between an artery and cross streets which may be one way or two way. The invention also applies to remote control of only one controller at only one intersection to insert or omit a clearance time period (lagging green) as desired.

Three-faced traffic signals S are placed at each intersection having arrows to indicate the direction of light from each of its three faces. Each face will be independently controlled and will include the usual green amber, and red signals. Traffic detectors D are placed in each ramp or cross street having traffic approaching the artery.

Traffic controllers T.C. at each intersection are connected by leads 1 and 2 both to their respective detectors and signal. Each such controller is adapted to normally provide right-of-way signals to artery traffic flow and to initiate a transfer of right-of-way to the side street in response to vehicle actuation along the ramp.

For convenience of description the side of the three faced signal facing the side street or turnpike exit ramps will be referred to as $B_1$ at the first intersection and $B_2$ at the second intersection. The sides of the signals facing each other will be referred to as $A_1$ inside and $A_2$ inside. Third sides will be designated $A_1$ outside and $A_2$ outside. Also for convenience the intersection at the left having the $A_1$ and $B_1$ signals will be referred to as the first intersection while the other intersection will be referred to as the second intersection. The side streets or ramps approaching these intersections will also be designated as 1 and 2.

The portion of the artery roadway between the intersection (above the turnpike) in FIG. 1 will be referred to as the "clearance space."

With two such closely spaced intersections it is generally most efficient to permit right-of-way to the ramps or side streets at substantially the same time and in the absence of any ramp or side street traffic the controller remains in a "rest" position leaving the right-of-way on the artery. Such a system may be provided and referred to as "mutual coordination" between two semi-actuated controllers. In such a system each of the controllers at one point in its cycle provides a coordination signal to the other controller so that the other controller can provide right-of-way to its side street only after the minimum time for arterial green of the former has expired as is well known. Thus if vehicle actuation is received at both controllers, the artery signal will turn red and the side street signals (B–1 and B–2) will turn green substantially simultaneously or in some predetermined pattern. Also if only ramp 2 has vehicles present, B–2 will be green and B–1 will be red; however this could occur only if the controller at the first intersection is in a particular position (rest for example) to provide a coordination signal.

FIG. 2 illustrates the left-turn problem that exists at two such mutually coordinated intersections for vehicles coming from the exit ramp. Such vehicles may have no place to go because other vehicles have previously blocked the "clearance space." Such blocking or trapping of vehicles may occur if both the artery inside and outside lamps turn red at the same time in response to vehicle actuation. These blocking vehicles were previously moving along the artery, and were in the clearance space (between the intersection) when the ARTERY inside light turned red as shown due to side street actuation.

To overcome the blocking of these left-hand turns, it is desirable to permit these stranded vehicles to leave (clear) the clearance space (without letting any other artery vehicles into the space) prior to the transfer of right-of-way to the side street.

Such a clearance may be provided by the provision of an "extended or artery clearance period" or "lagging green" on the artery inside signals. For example, the controller cycling and signal changing equipment may be arranged so that when actuations have been received on one or both ramps, the outside signal faces will go from green to yellow and then to red to stop artery flow into the clearance space while during this time the inside signal faces may retain the green for a lagging or clearance time period before going to amber and then to red; thereby permitting the trapped traffic to move. A typical abbreviated time cycle of one such controller is shown in FIG. 3 which shows the cyclic time sequence of signal indications of the artery outside, inside faces and the side street. This sequence chart particularly shows that the inside face remains green when the outside face is going from green to amber to red.

In FIG. 3, the sequence of timed steps of the traffic controller or signal is plotted horizontally for each of the three signals. The controller will normally be in its rest position with the signals as shown in farthest left vertical column; vehicle actuation of the controller will step it through a cycle so that a sequence of signal will appear as shown in the vertical columns from left to right.

After the last step (B-clearance), the controller reverts to its "rest" position at the left. It should be particularly noted that the ARTERY INSIDE face remains green throughout the "first clearance" and "lagging green" time period while the ARTERY OUTSIDE face is turning from green to amber to red.

Figure 5:
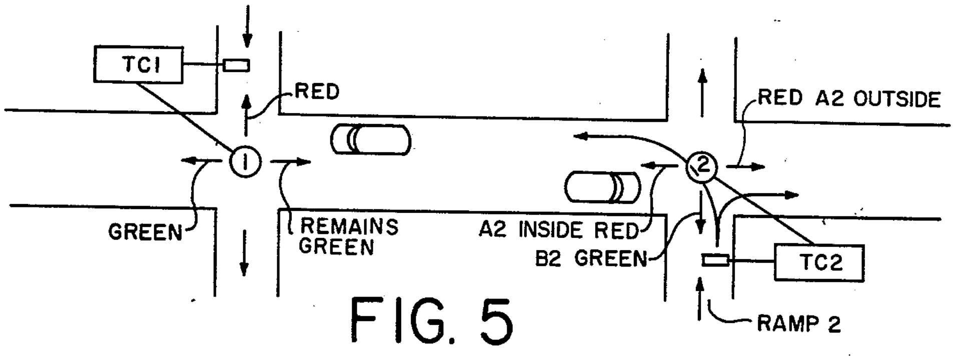

While it has been shown that the insertion of a lagging green or clearance signal on the artery inside face will aid in left turns from the side street when there are vehicles on each side street, the insertion of this clearance period when there is actuation on only one side street is both needless and has disadvantages as shown by diagrams of FIGS. 4 and 5. Since the clearance period requires time, if this time is spent needlessly, the controller is not as efficient in moving vehicles as is desired.

FIG. 4 illustrates what may happen if any artery clearance time period is inserted in the controller's cycle when there are vehicles on only one side street, as for example ramp 2. At one step of the cycle there would occur a condition in which: B–2 is still red before it can change to green; A–2 outside will have turned red to keep artery vehicles from entering the clearance space from the right; A–2 inside will still be to green to permit the artery vehicles 1 and 2 to leave the clearance space and cross the intersection. Subsequently A–2 inside will turn red and B–2 will turn green. Therefore vehicles on ramp 2 may turn left.

However, the controller at intersection #1 has not been actuated by vehicles and therefore is in its normal non-actuated condition providing artery green signals which permits vehicles, such as 3 and 4, to cross intersection #1 and move into the clearance space vacated by vehicles 1 and 2. Moreover vehicles 3 and 4 may block the #1 intersection. Consequently there has been no artery clearance of vehicles but merely a substitution of vehicles in the clearance space; in addition as a vehicle leaves ramp 2 and turns left onto the artery, this vehicle and any other vehicle in the clearance space may be prevented from subsequently making a left hand turn at #1 intersection by reason of the movement of vehicles 3 and 4. Thus the time periods devoted by the controller at intersection #2 to providing artery clearance have no beneficial result but serve only to stop vehicles approaching face $A_2$ outside without giving any gain in cleared space for a subsequent movement. Such stopping reduces the number of vehicles able to travel on the roadway, thus reducing the efficiency and usefulness of the roadway.

FIG. 5 illustrates the situation that will exist if the artery clearance period is omitted in response to vehicle actuation on ramp 2 only. The $A_2$ inside and outside signals are green (or red) at the same time. Most important is the fact that the time required for the actuated controller to complete its cycle will be shortened by an amount equal to the normal artery clearance period; thus controller efficiency is increased.

The left turn problem at intersection #1 is not substantially improved but vehicles can enter the #1 artery intersection sooner than if the clearance period existed because of the shorter artery time period at controller #2; in addition an earlier coordination signal is supplied to controller #1 from controller #2 thus permitting an earlier right-of-way transfer to ramp 1.

Subsequently in FIG. 10, there will be shown circuitry for improving the left turn capabilities at intersection #1 or #2 in such apparatus which omits artery clearance when only ramp 2 or 1 respectively has been actuated. In such a case, the $A_1$ outside signal is controlled to turn red (or right hand turn arrow) when the actuation on ramp 2 provides $B_2$ green and $A_2$ outside red (or right hand turn arrow) signals. Thus artery traffic can be prevented from entering intersection #1 from the left while ramp 2 or other artery vehicles may turn left or go straight through at intersection #1. Such a switching system thus would provide an artery clearance period ($A_1$ inside green) at one controller without increasing the cycle time of that controller.

Figure 6:
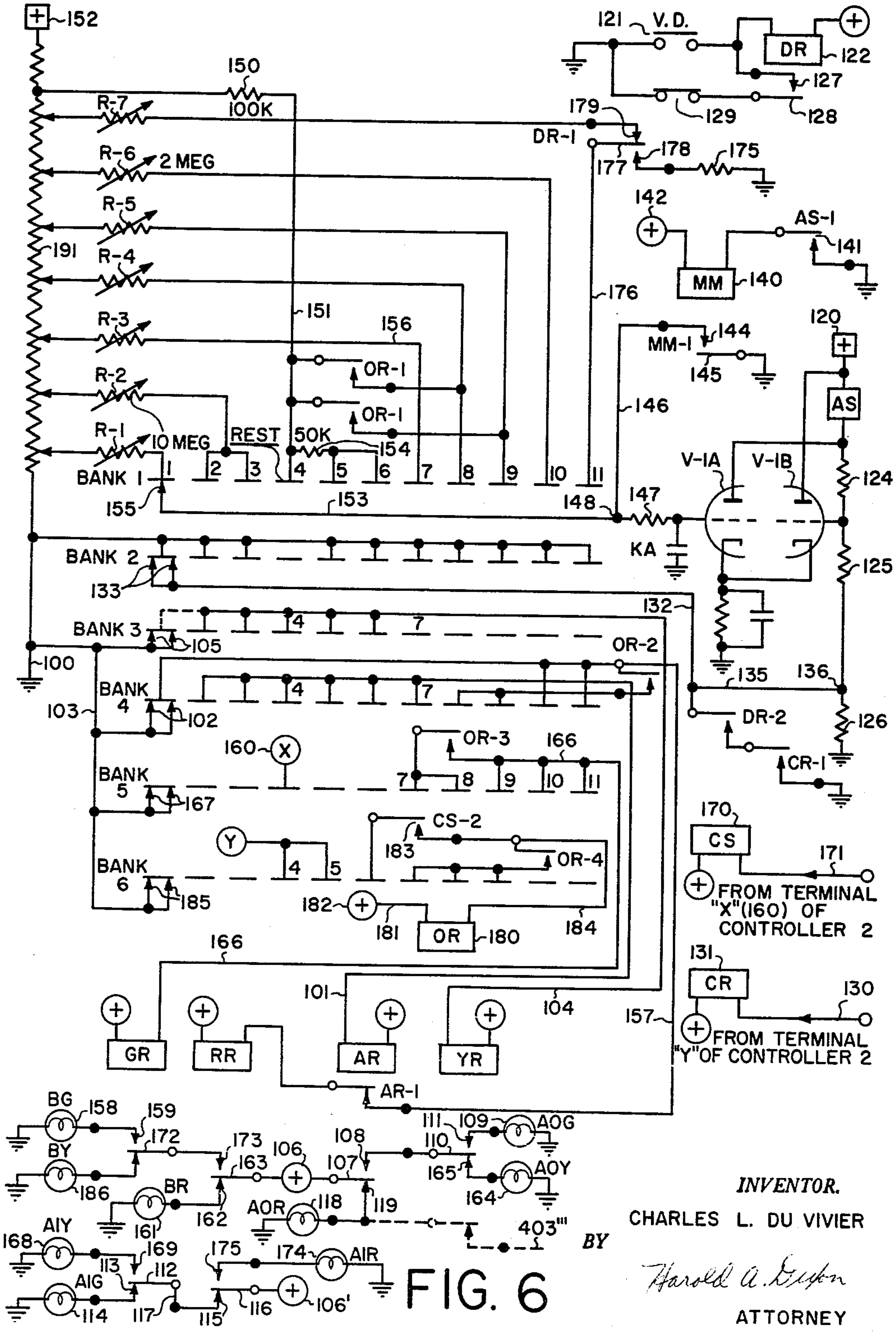
FIG. 6 shows one embodiment of a traffic controller which will provide an inside clearance time period or omit the period depending upon whether both or only one intersection is actuated.

FIG. 6 schematically shows the essential elements of a traffic controller which will cooperate with another controller in a system which will provide an artery clearance signal on both A–1 and A–2 inside faces of the signal in response to vehicle actuation on both side streets, but will omit or skip these clearance periods in response to vehicle actuation on only one side street.

While only the essential elements of a controller are shown in FIG. 6 to perform the inventive concept, the additional elements of such a controller are well known in the art and may be found for example in the manual for "Traff-O-Matic" (Reg.) Model 507 Controller, Service Manual 2003 copyright 1958 by Automatic Signal Division, Eastern Industries, Inc.

FIG. 6 illustrates a cyclic device as a six-bank line switch or stepping relay; eleven stationary sequential contacts are shown in each bank and a rotor contact associated with each bank is stepped through each contact on that bank in sequence; after completing a cycle, the rotor is in position to start another cycle. A motor magnet MM is shown for stepping the rotor contacts of each bank in unison.

The line switch contacts control the timing of each controller step and the connection of particular signal lamp switching relays to provide the desired signal indications in a particular step.

Normally the line switch is in a "rest" position 4 with the green signal shown on the artery. Vehicle actuation of one side street detector at one intersection and a coordination signal from the controller at the other intersection cooperate to cause the traffic controller at the one intersection to leave its "rest" position and start its cycle of steps. A side street green signal may subsequently appear after which the controller will return to its rest position; initiation of another cycle is dependent upon side street traffic, as is well known. A coordination relay is shown as CR.

Traffic signal control relays are shown as GR, RR, AR and YR; a particular combination of such energized relays will indicate green, yellow or red on the desired signal faces shown at the bottom of FIG. 6.

Each of the relays has one side connected to a source of power shown as a plus in a circle.

Movement of the cyclic device from one position to another subsequent position may be controlled by external means such as the coordination and vehicle detection means or may be controlled by timed steps within the controller. Such timed steps are provided by condenser KA which charges through one of the cyclic contacts through a resistor to a power source. After a preset time, the voltage on the condenser is sufficient to make tube V–1A conduct to energize relay AS and MM and step the cyclic rotor to a subsequent position while also discharging the condenser so that it may again charge.

Obviously, gas diodes may be used rather than a vacuum tube as is well known.

The timing resistor for each of the steps of the controller are shown as R–1 to R–7 at the top left of FIG. 6 and are connected to the contacts of bank 1. Their values are of the order of two to ten megohms.

In one or more of the cyclic steps, the controller may be timing artery inside clearance, thereby providing green signals to the artery inside indicators, while the artery outside signals are going from green to red.

The OR (omit) relay is provided to skip this clearance step or steps when only the side street of only one controller has been actuated. The manner in which this occurs will be clear from the following detailed disclosure.

*Detailed Disclosure*

Assume the controller is in its "rest" position 4, relays GR and RR are deenergized while relays AR and YR are energized. The circuit for operation of AR is from the positive source through the AR relay coil through lead 101, contact 4 of line switch bank 4, through the rotor contact 102 and line 103 to ground 100. Similarly relay YR is energized over lead 104 the fourth contact of line switch bank 3 and rotor 105 to ground 100. Relay RR is deenergized at open contacts AR–1 (AR energized) and the GR circuit is open at bank 5.

The "ARTERY outside green" AOG, lamp 109 is energized to ground from positive source 106, contacts 107 and 108, and contacts 110 and 111; "artery inside green" AIG lamp 114 is energized to ground from the source 106′, contacts 116 and 115, lead 117 and contacts 112 and 113. B-red (BR) lamp 161 is energized from ground through contacts 162 and 163 to source 106. Thus the "rest" position provides a green right-of-way signal to the artery and red on the side street. A chart of the sequence of signals is shown in FIGS. 8 and 9.

V–1 includes two tubes in which V–1B is normally conducting and V–1A is normally cut-off. Three bleeder resistors 124, 125 and 126 are connected through the AS relay between the positive source 120 and ground to supply a positive bias to the grid of V–1B. The bleeder current is insufficient to energize the AS relay. The grid of V–1A is controlled by the voltage across condenser KA.

In the "rest" position, the voltage across condenser KA (even though fully charged) is insufficient to fire V–1A because of the large cathode bias provided by the conduction of V–1B.

Now assume that a vehicle is present on the side street controlled by this controller. Vehicle detector switch 121 will close and energize a detector relay (DR) 122 which will remain energized through contacts 127, 128 and normally closed switch 129. Switch 129 is closed in all steps or positions of the controller except the side street B-vehicle position as will appear subsequently.

However, vehicle detection alone is insufficient to move the controller from its rest position—a coordination signal from the controller at the other intersection is also required.

This coordination ground signal appears at terminal 130 and energizes CR coordination relay 131; thus junction 136 is grounded through lead 135 and the contacts of DR–2 and CR–1. This grounding of junction 136 substantially reduces the positive bias on the grid of V–1B so that the charge on condenser KA may overcome the cathode bias causing V–1A to conduct to operate relay AS. V–1A and V–1B act as a monostable multivibrator so that the conduction of V–1A cuts off V–1B by a lowering of the grid bias at V–1B.

Operation of relay AS energizes motor magnet (MM) 140 from a positive source 142 through coil MM through (AS–1) contacts 141 to ground; this operation results in cocking the line switch in preparation for going to position #5; condenser KA is discharged to ground through resistor 147, junction 148, lead 146 and MM–1 contacts 144 and 145. The discharge of KA causes V–1 to revert back to normal with V–1B conducting and relays AS and MM deenergized. The line switch then advances to position 5.

It should be noted that not only does this controller receive a coordination signal at 130 but that it also sends a coordination signal to the other machine. The "outgoing coordination" ground signal is provided at terminal Y in rest position 4 and 5 of bank 6.

Thus since the controllers at each intersection are identical and each requires a coordination signal before it can leave "rest," one controller must always be in a "rest" position before the other can leave. In effect, this amounts to a request by one machine to the other for permission to move. Permission to leave will only be given if the other controller is in its positions 4 or 5. When the permission is given, both or only one machine may move to position #5.

Obviously one machine may move from position 4 to position 5 faster than the other machine; consequently outgoing coordination is provided in position 5 as well as 4 so that the slower controller is assured of enough time to respond and to follow from its rest position.

The reason for the movement of the controllers from positions 4 and 5 is that condenser KA has charged to a value sufficient to cause V–1A to conduct and energize the AS and MM relays. In position 4 it was required that contacts DR–2 and CR–1 be closed (by the DR and CR relays) to ground junction 136. However in all positions except 4, junction 136 is grounded through line 132, contact 133 and the contacts of bank 2 line switch. In position 4 the charge path was through resistor 147, lead 153, rotor contact 155, lead 151 and a small resistor 150 (100K ohms) to source 152; this is a very short time constant circuit. Similarly in positions 5 and 6, condenser KA charges for a very short time through resistor 154 (50K ohms) and 150.

The signals remain the same through positions 5 and 6 as in position 4, but this delay in right-of-way transfer is insignificantly short while serving important control functions.

If the action of the controller is to insert or not insert a clearance period in its cycle depending upon the actuation of another controller as well as itself, the controller must know the condition of the other controller and decide accordingly. Thus in position 6, one controller makes an inquiry of the other's condition and decides accordingly whether to omit or insert a clearance period as discussed below.

Each controller has an output terminal 160 (X) which is connected to position 4 in bank 5 of its line switch. Terminal 160 of one controller is connected to terminal 171 of the CS relay 170 of the other controller (not shown). Similarly this controller receives a signal from lineswitch bank 5 position 4 of the other controller at its terminal 171 to energize its CS relay. Now if controller #1 is in position 6 and controller #2 is still in position 4, then lead 160 of controller #2 will energize the CS relay of controller #1. Thus controller #1 knows that controller #2 has not left "rest" (has not been actuated) and thus controller #1 should skip or omit its clearance period. This knowledge is indicated by the energization of OR (SKIP OR OMIT) relay 180 from source 182 through lead 181, the OR relay coil, lead 184, contacts 183 (CS–2) and position 6 of bank 6 to rotor 185 to ground 100.

If controller #2 had been actuated, it would have moved from position 4 and the CS and OR relays in both machines would become or remain deenergized.

*Operation of the Controller With Clearance*

Assume that there have been actuated on both machines, so that a clearance period should be inserted. Subsequently we will consider the effect of the OR relay.

A group of variable resistor R–1 to R–7 are shown at the top left connected to any tap point on bleeder resistor 191. The connection of the resistors to the bleeder is shown as variable for simplicity because of their number although it should be understood that they may all be connected to the same or any point on the bleeder; the point being selected to give the proper calibration of the associated dials. Each of these resistors is sequentially in the charge path of condenser KA in the successive steps of bank 1 of the line switch and their preset setting determine the time in each of those positions.

In position 7, condenser KA charges from ground through KA, resistor 147, lead 153, rotor contact 155 of line switch (bank 1), contact 7, lead 156 and resistor R–3 to bleeder 191 and source 152 thereby timing the artery first clearance. Resistor R–3 is typically a resistor of approximately 2 megohms while condenser KA is typically 5 microfarads. As seen in FIGS. 3 and 8, this artery first clearance should provide green on the artery inside signal, yellow on the artery outside signal and maintain red on the side street. This occurs since relay YR is deenergized on lead 104 at contact 7 on bank 3; relay AR remains energized on line 101 at bank 4; relay RR is deenergized at open contacts AR–1; and relay GR is deenergized on line 166 at the open contact OR–3 and bank 5. Thus the B-red signal 161 remains energized through the back contacts 162 and 163 of relay RR; A inside green (AIG) signal 114 is energized through the back contacts 113 and 112 of GR and 115 and 116 of AR from source 106; A outside yellow lamp AOY, 164, is energized from source 106, through AR contacts 107, 108, and YR back contacts 110 and 165 to ground.

The first clearance period is completed when KA is sufficiently charged so that V–1A will conduct to energize relay AS, and MM to step the line switch to position 8. The grounding of junction 136 through 135, 132, rotor contact 133 of bank 2 permits KA to fire V–1A.

Figures 8, 9, 10:
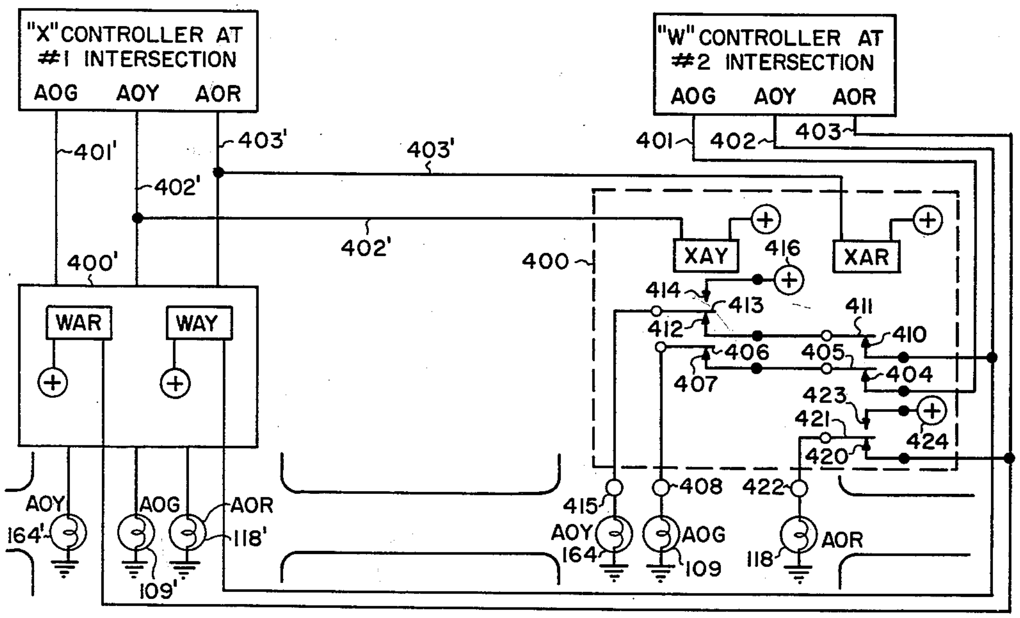
FIGS. 8 and 9 illustrate the time sequence of signals in the eleven step controller of FIG. 6 with and without an extended green clearance time period.
FIG. 10 illustrates a modification of FIG. 6 and FIG. 7 to provide a clearance period without extending the cycle time in response to actuation of only one intersection.

By a similar analysis, it can be shown that positions 8, 9, 10, 11, 1, 2 and 3 respectively are the artery lagging green, Artery second clearance, B-initial, B-vehicle, B-yellow and two steps ARTERY minimum, all of which terms are well known in the art; the color of the signal faces in each of these positions is shown in FIG. 8. The term B- may be interpreted as "side street."

In position 8 (lagging green), relays YR, AR, RR, and GR are all deenergized (as can be seen from their connection to the lineswitch); thus lamps 161, 118 and 114 are energized to provide B-red, A outside red and A inside green as shown in FIGS. 3 and 8.

In position 9 (second clearance), relay GR is energized over line 166 to ground via rotor contact 167 of bank 5 while RR, AR and YR are deenergized. Artery inside yellow lamp AIY 168 is energized through contacts 169, 112, lead 117, contacts 115 and 116 from source 106'. A outside red signal 118 (AOR) remains energized from source 106 and contacts 107 and 119. B-red also remains energized.

In position 10 (B-initial), relay GR remains energized over line 166 from bank 5; relay RR is energized over line 157 and ground from rotor 102 of bank 4; AR and YR remain deenergized. B-green lamp BG, 158, is energized through 159, 172, 173, 163 from source 106; A inside red lamp AIR 174 is energized through contacts 175 and 116 from source 106'; Artery outside red lamp 118 remains energized.

In position 11 (B-vehicle) relays GR and RR remain energized as in position (10) to provide a green signal to the side street and red to the artery. However, as is well known such a green period may be extended depending upon side street traffic. Thus, as was stated previously, in position 11 of the line switch, contact 129 does not lock the DR relay. Condenser KA now charges through lead 176, the normally closed contacts (of DR–1) 177 and 179 to the B-vehicle potentiometer R–7; if a vehicle crosses the side street detector during the B-vehicle period to actuate the DR relay, condenser KA will be discharged through resistor 147, lead 153, rotor contact 155, lead 176, DR–1 contacts 177 and 178 and resistor 175 to ground. This continued charge and discharge of condenser KA delays the energization of V–1A until the vehicles cease to actuate the side street detector. Of course a maximum limit is set on this type of action as is well known by means of another suitable timing device, not shown. Consequently the side street green and artery red signals are shown with an arrow in position 11 of FIG. 8 to indicate the periods are extendable.

From position 11, the line switch returns to position #1 to provide a side street yellow signal BY at 186 and artery red signal AIR and AOR at 174 and 118. This occurs since relay RR is energized over line 157 and the first contact on bank 4 to grounded rotor contact 102; GR, AR and YR are deenergized.

In positions 2 and 3 an artery minimum period is timed before the controller returns to its rest position. In these positions, artery green signals 114 and 109, and B-red 161 are energized. This occurs since bank 4 had previously energized relay AR and bank 3 now energizes relay YR.

Thus a complete cycle of the traffic controller has been provided in which an extended artery green clearance is provided in response to vehicle actuation on both side streets.

*Omission of Extended Clearance*

As previously shown if only one side street has been actuated, the "OR" relay will be energized in the controller for that actuated intersection. This effectively results in the omission of the extended artery green clearance as will now be shown (this artery clearance occurred in positions 7, 8 and 9 of the lineswitch as previously described).

If the omit relay OR (180) is energized, the contacts OR–1, OR–2, OR–3 and OR–4 will be closed; OR–4 contacts are holding or lock contacts for the OR relay and maintain OR energized on bank 6 through the clearance positions 7–9 to grounded rotor contact 185.

OR–1 contacts connect contacts 8 and 9 of bank #1 to line 151, through a low resistance 150 (100K ohms) bleeder 191 and source 152. This provides a very short charging time for the condenser KA so that KA is very rapidly charged to fire tube V–1A. The controller therefore substantially skips or omits these artery clearance timing periods which would normally be provided by resistor R–4 and R–5 in steps 8 and 9 of the lineswitch.

However, it must also be assured that the traffic signals are also skipped and do not show these clearance signals even for an instant during these rapid steps. Consequently, contacts OR–3 connect contacts 7 and 8 of bank 5 to line 166 thereby energizing the GR relay in those steps; contacts OR–2 connect contacts 8 and 9 of bank 4 to line 157 to energize the RR relay (the AR relay has already been deenergized by that time).

Therefore in position 7, relays GR and AR are energized; RR is deenergized at contacts AR–1 while YR is not connected at bank 3. This energizes A inside yellow lamp 168 (rather than green as would exist if there was a green clearance period), B-red lamp 161 and A outside yellow lamp 164.

In position 8, GR is energized over line 166 through OR–3 contacts and grounded rotor contact 167 of bank 5; relay RR is energized through AR–1, line 157, OR–2 contacts and grounded rotor 102 of bank 4; AR and YR are deenergized; as a result A inside red lamp 174, B green lamp 158 and A outside red lamp 118 are all energized.

In position 9 relay GR and RR are energized as in position 8 to provide the B-green and A-red signals.

A chart of the various sequences of signals in the eleven steps of FIG. 6 are shown in FIG. 8 with an artery green clearance period; FIG. 9 shows the signals with the artery clearance periods omitted. The two charts differ in that the Artery inside signal is a timed green signal in positions 7 and 8 of FIG. 8 while in FIG. 9, this signal is a yellow and red.

Also steps 8 and 9 of FIG. 9 are very short (skipped) as opposed to the timing that occurs in these steps in FIG. 8.

Figure 7:
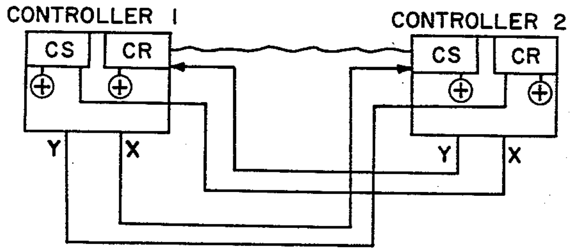
FIG. 7 illustrates the connections between controllers of the type shown in FIG. 6 which operate at the two intersections.

FIG. 7 shows the cross connections between two controllers X and W which each have a CS and CR relay interconnected to provide coordination and skip information to each other. Terminals X and Y are the same as shown in FIG. 6.

The preceding disclosure has shown apparatus for including or excluding an extended artery clearance time period between two closely spaced mutually coordinated traffic controllers.

Such a system provides a more efficient use of the time devoted by each controller to complete a cycle of signals.

However, a left turn from the artery to the side street may be hindered by the artery traffic at the non-actuated intersection (since the artery has the right-of-way at that intersection). FIG. 10 shows a connection of two controllers, of the type shown in FIG. 6 for example, which will overcome this difficulty. This circuit provides for clearing the artery at the non-actuated intersection by controlling the signals at that intersection rather than by providing an extended time period in the controller cycle for clearing.

The left turn difficulty is overcome by showing a red light to the artery outside signal at intersection #1 at substantially the same time as the B-green signal at intersection #2 is permitting the side street traffic to flow.

Two controllers X and W each may have circuitry such as shown in control means 400′ and 400 respectively.

Each control 400 and 400′ also may have two relays; controller W will have relays XAY and XAR in block 400; similarly controller X will have relay WAY and WAR in block 400′. The designation of the relays infers their operation; for example, relay XAY is controlled by the X controller and relates to an artery yellow signal.

The solution of the left turn problem in FIG. 10 includes the recognition that if the inside signal at the non-actuated intersection is allowed to stay green while the outside signal is switched to red at the same time as the artery outside signal at the actuated intersection, artery traffic between the intersections may turn left or go straight through at the non-actuated intersection while the outside red signal prevents vehicles from moving into the clearance space.

Assume that controller W is at intersection #2 and that controller X is at intersection #1. If a side street vehicle appears at intersection #2, controller W will start from "rest" position 4 and move to provide B-green and Artery red. Controller X may do exactly the same as W (if it has been actuated) or it may remain at rest. Consequently an extended clearance period may or may not be inserted in the cycle of the machines as previously shown.

If both controllers are actuated, both artery outside signals are red so that left hand turns at both intersections are permitted.

However, when only one controller (W, for example) is actuated, if the outside signal of the controller X is controlled to appear the same color as the outside signal at W, vehicles may be prevented from entering the intersection at X while the normal inside green signal of controller X will permit left hand turns at that intersection.

As a result this connection provides one-way artery clearance within the normal cycle of the controller X without any extension of controller X's time for the purpose of giving clearance.

A connection may be made to interrupt the outside lamps 109, 164 and 118 in FIG. 6 of each controller; leads 401, 402, 403 (401′, 402′, 403′) from each controller lamp circuitry connect to the circuit block 400 and through a series of switching contacts to the above mentioned lamps. The switching controls in circuit block 400 (of controller W) are controlled by leads 402′ and 403′ of controller X; conversly leads 402 and 403 of Controller W control the signals lamps at X by means of block 400′.

When the controller W is in a position to provide A outside green, a signal is provided at 401 through the relay XAR back contacts 404 and 405, and relay XAY back contacts 407 and 406 to an output terminal 408 which would be connected to lamp 109 to complete the "W" AOG signal lamp circuitry.

Similarly when "W" calls for A outside yellow, a connection is made from 402, through 410, 411, 412, 413 to output terminal 415 which would be connected to lamp 164 to close the A outside yellow lamp circuitry.

When controller "W" calls for A outside red, a circuit is connected from 403, through 420, 421 to output terminal 422 to lamp 118 to complete the connection of the A outside red lamp.

However, assume that controller X has been actuated; as the X controller moves from "rest" toward side street green, it must pass through A outside green, amber and red signals. This will supply signals in sequence at 402′, and 403′. Thus relays XAY and XAR are energized in sequence and the outside yellow signal of "W" controller is energized at 415 through 413 and 414 from source 416. Subsequently lamp W–AOR is energized from source 424 through 423, 421, and terminal 422.

Thus it will be seen that the A outside signal face at intersection 2 (W-controller) is caused to display the same indication as that being shown at the outside face of the signal at intersection #1 (X-controller).

In a similar manner, the lamp at X intersection will be controlled if W controller is actuated.

Figure 11:
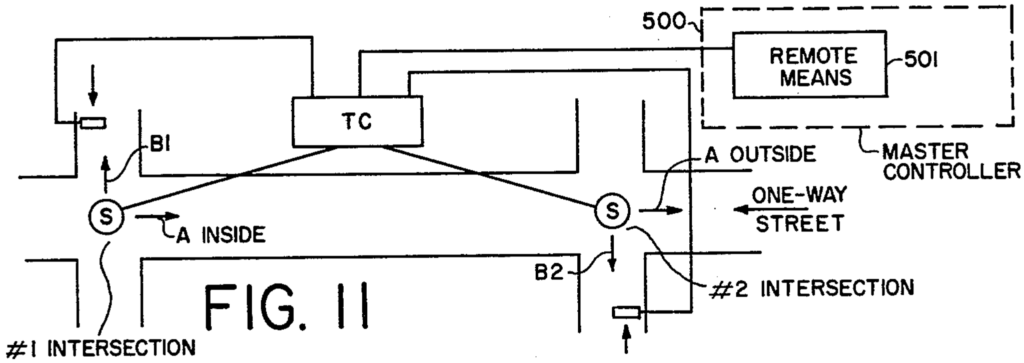
FIGS. 11 and 12 illustrate other applications of the invention.
Figure 12:
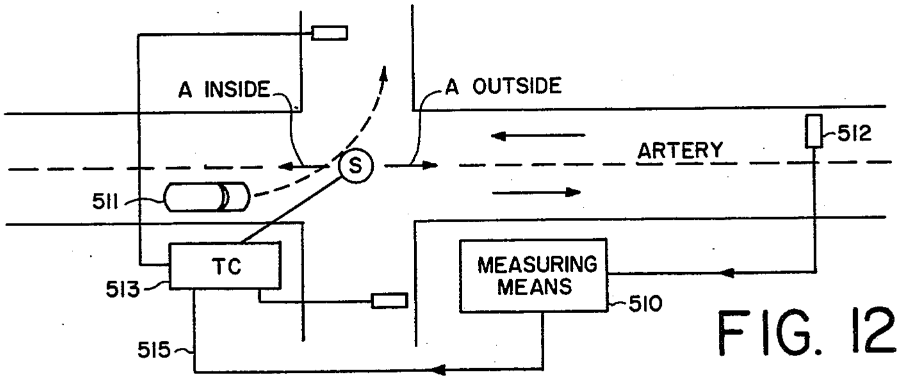

Other applications of the invention are shown in FIGS. 11 and 12 using controllers of the type shown in FIG. 6. It is often desirable that local controllers along a roadway all be controlled by a master controller shown at 500. Such a master controller will provide a master time within which each local controller must remain; such time cycles are varied according to traffic demand as is well known.

Accordingly FIG. 11 shows the application of a controller to two intersections along a one-way street with appropriate designation of the inside and outside signals.

Accordingly in heavy traffic when the master is providing a long time cycle (as in conventional) it may be desirable to provide a green clearance period on the inside lamp at intersection #1 to clear the area between intersections 1 and 2 so that side street vehicles may make a left-hand turn at intersection #2 onto the one-way street.

However under light traffic conditions, the master cycle is usually shorter and also the left-turn problem may not be as serious so that remote means 501 may be used to omit or skip the clearance period; thereby shortening the local cycle at intersection #1 to comply with the master cycle and provide greater traffic efficiency.

FIG. 12 illustrates a further modification to omit or insert an additional artery clearance period at an intersection as desired. An artery signal is shown having inside and outside signals. A vehicle 511 desiring to make a left-hand turn at the intersection is opposed by artery traffic moving from right to left. If that artery traffic is heavy, the left turn is difficult. Measuring means 510 are shown to measure either traffic density, volume or average vehicle speed in response to vehicle detector 512 as is well known.

If the artery volume for example is large, a signal is provided on line 515 to insert a clearance period into controller 513 and not insert this period if volume is low.

Referring back to FIG. 10, it was shown that the artery outside signals at both the actuated and the non-actuated intersections simultaneously turn from green to amber and then to red together. In some cases, it may be desirable that the outside signal at the non-actuated intersection lead the outside signal at the actuated intersection so that that signal may revert back to a green artery right-of-way before the green artery right of way appears at the other intersection.

Such a modification is possible by connecting contacts 1 and 2 on bank 3 to each other; therefore during the B-yellow position 1 of the actuated controller, the YR relay will be energized. If a normally closed YR contact is connected from the junction of 118 and 119 in FIG. 6 to lead 403' of FIG. 10 to normally energize the XAR relay.

Therefore if relay YR is energized during the B-yellow of the actuated controller, the YR contact will be opened to deenergize the XAR relay so that the non-actuated control returns to its normal condition with AOG energized.

Having thus described the various aspects of my invention it will be obvious that while one preferred embodiment of the various aspects of my invention have been shown, numerous equivalent modifications are possible within the scope of my invention. Accordingly, my invention is defined in the following claims.

I claim:

1. In a traffic control system for two intersections, each having a side street and a vehicle detector therefor, spaced along a roadway in which a relatively short portion of said roadway is common to both intersections and in which the control normally provides right-of-way traffic signals at both intersections along said roadway and in which said control provides an extended right-of-way clearance time period for vehicles within said short portion of roadway and subsequently transfers the right-of-way to the side street in response to vehicle actuation of the side street detector, the improvement in the system which includes means for controlling the signals at one intersection directly without said clearance time period to prevent vehicles from crossing said one intersection into said short roadway portion while right-of-way is permitted to other vehicles in said common space to cross the other intersection and including cyclic control means to so control the right-of-way signals at each intersection, and including an outside signal at each intersection directed toward opposite directional traffic flow, and circuit means at each control means for controlling the traffic signals at the other control means in predetermined portions of the cycle so that the outside signal at one controller will provide the same visual indications as the outside signal at the other controller.

2. A traffic control system for two closely spaced intersections of cross street with a common roadway including means responsive to traffic actuation on a cross street at each intersection, signal control means at each intersection for normally according right-of-way traffic signals in two directions along the common roadway and for transferring right-of-way to the cross street in response to vehicle actuation thereon, and means interconnecting said signal control means for providing right-of-way signals in only one direction along said common roadway at only one of said intersections in response to vehicle actuation only at the other intersection.

3. In a traffic control system for two spaced adjacent intersections along a roadway common to cross streets individual to the respective intersections having traffic control signals and cyclic control means at each intersection in which the control means normally accords right-of-way signals to the roadway and initiates a cycle in response to cross street vehicle actuation to accord a clearance period of right-of-way only to vehicles on the roadway between the intersections prior to transfer of right-of-way to the cross street, the improvement in the system including means in each one said control means for indicating to the other said control means whether said one control means has so initiated such cycle from its normal right-of-way position and means in each said control means when actuated for omitting said clearance period in response to said last named means indicating that the other said control means is in its said normal right-of-way position without said initiation of a cycle.

4. A traffic control system for two closely spaced intersections of cross streets along an artery including traffic signals at each intersection having at least an inside signal face controlling artery traffic between the intersections, an outside signal face controlling artery traffic approaching the intersections and a third face controlling traffic on the side street, each signal face having at least a green signal and a red signal, vehicle detection means in the cross streets, cyclic control means at each intersection having a normal rest position displaying said green signals on both the inside and outside signal faces and displaying said red signal on said third signal face at each controller and for initiating a cycle to transfer the right-of-way in another position of the cycle to display said green signal at said third face in response to vehicle detection on the cross street, means at each controller for testing whether a right-of-way transfer has been initiated at the other controller, means in each controller for providing an artery clearance time period in a further position of the cycle for vehicles between the intersections displaying said green signal on the inside face and said red signal on the outside face, and means controlling said last means for omitting said clearance time period from said cycle at one controller in response to said testing means indicating that the other controller has not initiated a transfer of right-of-way at the time that said one controller has initiated its cycle.

5. The combination as in claim 4 further including signal control means for controlling the outside signal faces of each intersection from the controller at the other intersection for providing substantially the same outside signal display at the non-actuated intersection as appears at the outside face of the actuated intersection when a transfer of right-of-way has been provided at the actuated intersection thereby preventing artery vehicles at the non-actuated intersection from entering the space between the intersection.

6. A traffic controller including first, second and third switch contacts, control means for connecting said switch contacts to one terminal of a source of power in sequence through a cycle; means connecting said first, second and third switch contacts to the other terminal of the source for providing artery green signals in two directions, artery green signals in one direction only and side street green signals respectively; a control circuit controlling said control means, means for receiving coordination and cyclic position information from another controller at an adjacent intersection, means closing said control circuit in response to both vehicle detection and coordination for initiating a cycle of the control means from said rest position to said second contact, means responsive to said test signal for controlling said control means to rapidly skip through said second contact and for making said one-way artery green signal inoperative so that the side street green signal is rapidly displayed in dependence upon the test signal received from the other controller.

7. A traffic controller including a cyclic signal switching means having at least three positions arranged in sequence to provide two-way artery green, one-way artery green, and side street green right-of-way traffic signals in sequence, means for advancing said cyclic means through its cycle, means responsive to vehicle actuation, first and second relay circuits, within said cyclic switching means, means responsive to energization of both the first relay circuit and vehicle actuation means for controlling said advancing means for initiating operation of said cyclic switching means from its first position to its next succeeding position, means responsive to the energization of said second relay circuit for rapidly advancing said cyclic means through said succeeding position to a final position while omitting said one-way artery signal and connecting side street right-of-way signals in both of said last positions.

8. A traffic control system for two closely spaced intersections of cross streets with an artery including traffic signal at each intersection, each signal including one face directed toward the side street, an inside face directed toward vehicles between the intersections and an outside face directed toward traffic approaching both intersections; vehicle detection means along the cross street; a cyclic controller at each intersection including a plurality of switching contacts arranged in sequential positions, a rotor contact, condenser means, means connecting the rotor, condenser and contacts across a source of power and means for advancing the rotor from one position to another for varying the condenser charge through the rotor and switch contacts and for responding to a predetermined charge on said condenser for advancing the rotor to a succeeding position; means normally maintaining said controller at rest in a first of said positions for providing right-of-way signals to the artery inside and outside signals in that position, an information relay in each controller connected to the other controller for indicating the cyclic position of the other controller, coordination relay in each controller means connected to the other controller, means responsive to operation of said coordination relay and said vehicle detection means for initiating a cycle of said controller from said rest position to a succeeding position, means operating in said succeeding position in response to the information relay for skipping the position in the cycle normally providing one-way artery right-of-way signals while directly providing side street right-of-way signals, and means at each controller for providing substantially the same outside signals at a non-actuated intersection as are present at an actuated intersection so that a clearance period is provided at the non-actuated intersection.

9. A traffic signal controller for an intersection of a cross road approach and an inside artery approach and an outside artery approach, said controller including traffic actuated means for actuation by traffic in the cross street approach, go signal control circuits and stop signal control circuits for the respective approaches, a cyclic switching mechanism having a plurality of switches and a multiplicity of switching positions through which it is adapted to be operated for operation of said switches for control of said control circuits, time control means controlled by certain of said switches in certain positions of said cyclic switch mechanism for maintaining said cyclic switch mechanism normally in a position operating the go signals on both approaches of the artery and the stop signal on the cross approch in absence of traffic actuation of said traffic actuated means, remotely controlled means, and means controlled by certain other of said switches and by said remote control means and said traffic actuated means for initiating a cycle of operation of said cyclic switch mechanism from said normal position for interrupting the normal operation of the signal circuits and for operating the go signal circuit on the cross approach and the stop signal circuits for both approaches of the artery and returning to said normal condition in response to traffic actuation of said traffic actuated means when said cyclic switch mechanism is initially in its normal condition and when said remote control means permits said initiation of said cycle, and further remote control means for predetermining in connection with said initiation of said cycle whether or not said cycle will include a period of operation of the go signal circuit for the inside artery approach while operating the stop signal circuits for the outside artery approach and the cross street approach between said normal rest condition and of said operation of said go signal for the cross street approach, and said controller also including an output circuit means for remote control of a corresponding said further remote control means in any other such controller when the first mentioned controller is so initiating its cycle of operation.

References Cited in the file of this patent

UNITED STATES PATENTS

| | | |
|---|---|---|
| 2,122,410 | Eames | July 5, 1938 |
| 2,542,978 | Barker | Feb. 27, 1951 |
| 2,834,001 | Wilcox | May 6, 1958 |